May 7, 1957　　A. O. BRUESTLE ET AL　　2,791,414
CUTTER BIT AND HOLDER

Filed July 30, 1954　　2 Sheets-Sheet 1

INVENTORS.
ARMIN O. BRUESTLE,
JOHN R. CARTLIDGE
AND CLAUDE B. KREKELER.
BY Allen + Allen
ATTORNEYS.

May 7, 1957  A. O. BRUESTLE ET AL  2,791,414
CUTTER BIT AND HOLDER

Filed July 30, 1954  2 Sheets-Sheet 2

INVENTORS.
ARMIN O. BRUESTLE,
JOHN R. CARTLIDGE
BY AND CLAUDE B. KREKELER.

ATTORNEYS.

United States Patent Office 2,791,414
Patented May 7, 1957

2,791,414

CUTTER BIT AND HOLDER

Armin O. Bruestle, John R. Cartlidge, and Claude B. Krekeler, Cincinnati, Ohio, assignors to The Cincinnati Mine Machinery Company, Cincinnati, Ohio, a corporation of Ohio Application July 30, 1954, Serial No. 446,716

21 Claims. (Cl. 262—33)

This invention relates to cutter bits of the type which are formed in the art by making cuts across a rod of steel of suitable cross section, the cuts being aslant to the axis of the rod or bar. Where the cuts are parallel, the resultant cutter bits have, in side elevation, the form of parallelograms with opposite acute and obtuse angles. Since one axis of the parallelogram is usually longer than the other, such bits are frequently referred to as rhomboidal cutter bits and will so be referred to here for the sake of brevity. The portions of the cutter bit at the acute angles of the parallelograms form oppositely directed cutting points so that the bits are reversible in suitable holders.

The bits may be formed from hardened steel and/or they may have facings or inserts at the cutting points of hard alloy material, such as tungsten carbide.

One object of the invention is to provide a cutter bit having a new, useful and advantageous form, and in particular a cutter bit characterized by relatively massive lateral ribs of substantially rectangular cross section.

The cutter bits are normally formed from rod or bar stock having a rolled cross sectional configuration; and it is an object of the invention to provide cutter bits which can be so formed conveniently and inexpensively. Certain aspects of the invention are not necessarily confined to the provision of rhomboidal cutter bits. The cross sectional shape of the rod or bar can be so cut as to form double ended, trapezoidal cutter bits with similar advantages of cross sectional shape, stability and control. However, the invention herein will be described in connection with rhomboidal cutter bits and holding means therefor.

It is an object of the invention to provide a combination cutter bit and holder in which the positioning of the cutter bit is largely determined by the aforesaid lateral ribs. This is of a special advantage in view of the fact that some dimensional and shape inequalities may occur in the manufacture of large numbers of relatively inexpensive cutter bits which are to be discarded when sufficiently worn at both ends.

It is an object of the invention to provide holding means for cutter bits of the type set forth, wherein the location and adjustment of the cutter bits as well as their resistance to some at least of the cutting strains is adequately provided, while wear on the holding means is minimized.

It is an object of the invention to provide cutter bit holding means of both reversible and non-reversible types. The reversible cutter bit holding means provide ready adjustment of the cutter bit for effective cutting when the chain, drum or other driving means has been reversed in direction of rotation.

These and other objects of the invention which are set forth hereinafter or will be apparent to one skilled in the art upon reading these specifications, are accomplished by that structure and arrangement of parts of which certain exemplary embodiments will now be described. Additional objects of the invention will be apparent to one skilled in the art upon reading these specifications. Reference is made to the accompanying drawings wherein.

Figure 2:
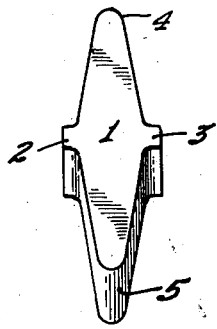
Figure 2 is a plan view of a cutting bit.

Referring first to Figure 2, it will be seen that the preferred form of the cutter bit has a body 1 characterized by lateral ribs 2 and 3, the opposite sides of which are parallel or substantially so. Neglecting these ribs, the cross sectional shape of the body of the bit has the general form of a rhombus or diamond shaped figure with the acute angle ends rounded as at 4 and 5. It is an advantage of the shape set forth that the edge portions of the bit may be made relatively narrow whereby their cutting resistance is diminished, while the bit is strengthened and given stability by the relatively massive ribs 2 and 3. As will be appreciated from the side elevation in Figure 1, the bit is formed from a bar or rolled steel in such fashion as to provide cutting points 6 and 7.

As is well known, many mining cutters are provided with driven chains operating about a cutter bar or drum. Alternate ones of the links of these chains are provided with projections 8, which are socket members. Mining cutters are not, however, limited to chains; and the socket members may be part of or affixed to a rotary drum, arm or other suitable driving means. For convenience the exemplary embodiments given below are discussed with reference to chain driven mining cutters. It must be understood, however, that in practice this invention is not so limited.

The above mentioned socket members are pierced transversely of their axis to form socket openings as at 9, the socket openings being generally a rectangular cross section. In the particular embodiment, the holding means are non-reversible and the socket member is cut away laterally as at 10, leaving a forward projection 11 and a rearward projection 12, the latter being of sufficient mass and thickness in the direction of motion of the chain to be capable of sustaining the cutting thrusts.

In the opening 10 there is shown a forward or anvil member 13, preferably bottomed on the opening and resting against the projection 11. It is possible to make the anvil member integral with projection 11, but a separate anvil member has the advantage that it may be readily replaced if it becomes broken or worn. A convenient way of mounting the separate anvil member 13 involves providing it with a forwardly extending stud 14 which engages in an opening 15 in the member 11.

Figure 7:
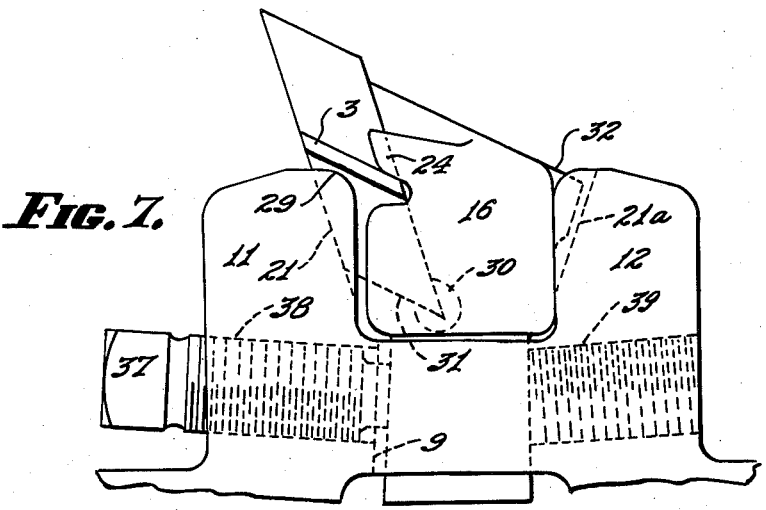
Figure 7 is another partial elevational view of a modified assembly of a cutter bit and holding means which is reversible.

The holding means also comprises a rear clamping element 16 having a relatively broad rear face which rests against the forward face of the projection 12 as at 17. The rear clamping element has a downwardly depending shank 18 which enters the socket perforation 9 in the socket member 8, abutting the rear face of the opening. It may be held in place by suitable means such as a set screw 19 threaded into an opening in the socket forming member, the set screw preferably being aslant as shown in the opening. Preferably the leading edge of the shank 18 is slanted so that the axis of the set screw 19 is perpendicular to it. This enables the full surface of the clamping end of the set screw 19 to engage the leading edge of the shank 18, providing a firm hold on the shank 18 and resisting its endwise withdrawal from the socket perforation 9. As is shown in Figure 7 the rear clamping means can be further held by a tongue 32 which fits into a slot 33 in the projection 13. This tongue and slot assembly forms an additional precaution against sidewise tilting or motion of the rear clamping means about its long axis.

Figure 1:
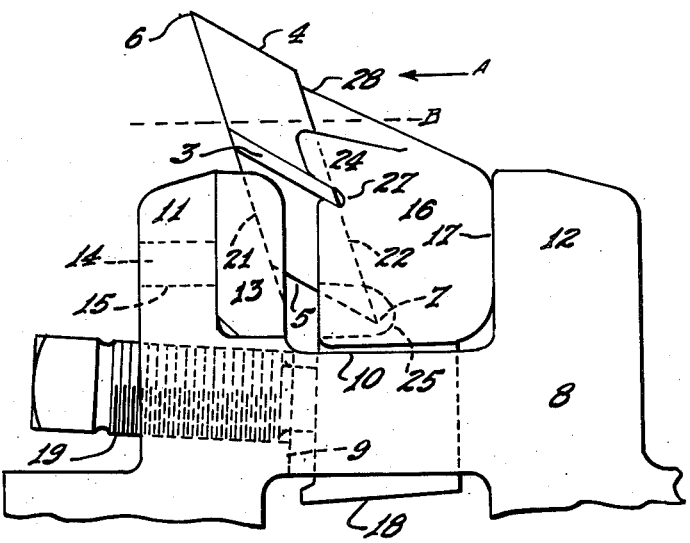
Figure 1 is a partial elevational view of a bit and bit holder elements associated with the socket element of a cutting chain.
Figure 3:
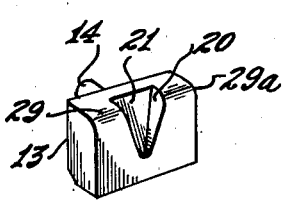
Figure 3 is a perspective view of a front supporting element used for bit engagement.

In the embodiment of Figures 1 and 3, the anvil member 13 is provided with a recess 20 having a rear wall or face 21 lying aslant and having that angularity to the axis of the socket forming opening 9 as is desired for the proper positioning of the bit.

Figure 4:
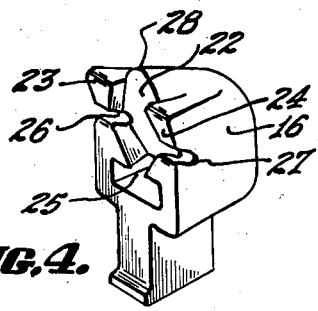
Figure 4 is a perspective view of a rear clamping element.

The rear clamping element 16 has a recessed portion providing a slanting forward face 22 (see Figure 4). The face 21 of the anvil member and the face 22 of the clamping member are parallel when the devices are in assembly. The rear clamping member 16 has parts projecting forwardly of the face 22 as at 23 and 24, and forming with the face 22 a sort of socket for the reception of the rear portion of the bit. Below these projections there is a recess, generally indicated at 25, so that the clamping member can receive the lower cutting point of the bit without directly engaging it.

The rear clamping member 16 has its portions 23 and 24 slotted transversely as at 26 and 27; and the rear end portions of the bit ribs 2 and 3 are received in these slots, as will be clearly apparent in Figure 1. The projecting portions 23 and 24 of the socket member 16 preferably terminate upwardly at about the same horizontal level as the front ends of the ribs 2 and 3 of the bit. Thus, these ribs, during the cutting operation, prevent the material being cut from contacting and wearing away the projections. The clamping member, however, may be prolonged upwardly as at 28 behind the bit proper to give additional support thereto. The direction of motion of the structure in the cutting operation is indicated by the arrow A in Figure 1.

Since the face 21 of the anvil member and the face 22 of the rear clamping member are parallel but aslant to the axis of the socket forming opening 9, it will be seen that any fore-to-aft dimensional discrepancy in the bits can be accommodated by the position of the rear clamping member 16 axially. The front and rear faces of the bit are clamped between the faces 21 and 22 of the anvil and clamping members. In the assembly of Figure 1, the bit is restrained from axial movement by the engagement of the ribs 2 and 3 in the slots 26 and 27 of the clamping member. The face 22 of the clamping member sustains primarily the rearward thrust of the cutting operation, transmitting this thrust to the projection 12 of the socket forming member through the face-to-face contact at 17. Inward thrust of the bit is borne in part by the face 21 of the anvil member and in part by the bit ribs. It will now be evident that in this embodiment, the bit ribs serve as positive locating means so that dimensional discrepancies in the cross sectional shape of the cutter bit are compensated for, and it is not necessary either that the depression in the anvil member or the depression in the clamping member accurately fit the cross sectional shape of the bit.

In the assembly of Figure 1, as has been explained the bit is clamped between the anvil and the clamping member on its forward and rear faces, the ribs 2 and 3 engaging in notches in the clamping member. The ribs thus not only sustain the inward thrusts encountered in the cutting operation, but the engagement of these ribs as aforesaid prevent tilting of the bit. It will be evident that the arrangement in Figure 1 is such that different bits showing considerable dimensional variations can be accommodated and tightly clamped.

Figure 5:
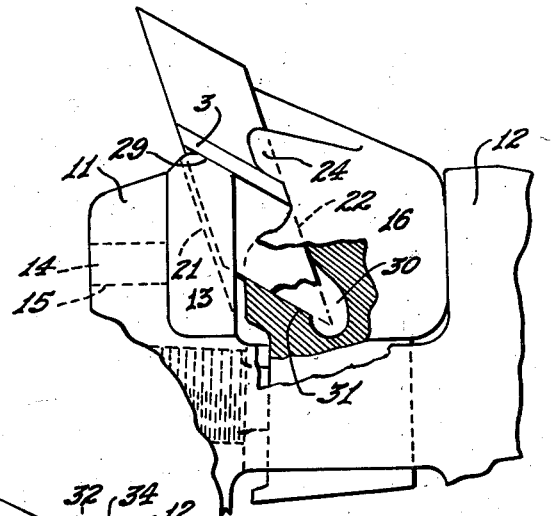
Figure 5 is a partial elevational view of a modified assembly of cutter bit and holding means.

A somewhat different arrangement is shown in Figure 5 wherein like parts have been given like index numerals. In this instance the anvil member 13 has upper edge portions 29 and 29a which are shaped and positioned in such a way that the under sides of the ribs 2 and 3 rest against them. If the bit be tightly clamped between the surface 21 of the anvil member and the surface 22 of the clamping member, the anvil member can resist the inward thrust encountered in cutting. The clamping member 16 has projections arranged to engage above the ribs, one of these projections being shown at 24 in Figure 5; but the clamping member in this instance is not arranged to engage the ribs from beneath.

If, however, the bit is not tightly engaged between the surfaces 21 and 22, then additional means must be provided to prevent a turning or tilting of the bit in this arrangement. The clamping member in Figure 5 is provided with a recess 30 accommodating the lower point of the bit without contacting it, but the clamping member is also formed with a portion 31 upon which the lower edge of the bit bottoms. Since the bit in this instance tends to wedge between the surface 22 and the bottoming portion 31 of the clamping member, the bit will function properly if held generally against too great displacement.

Figure 6:
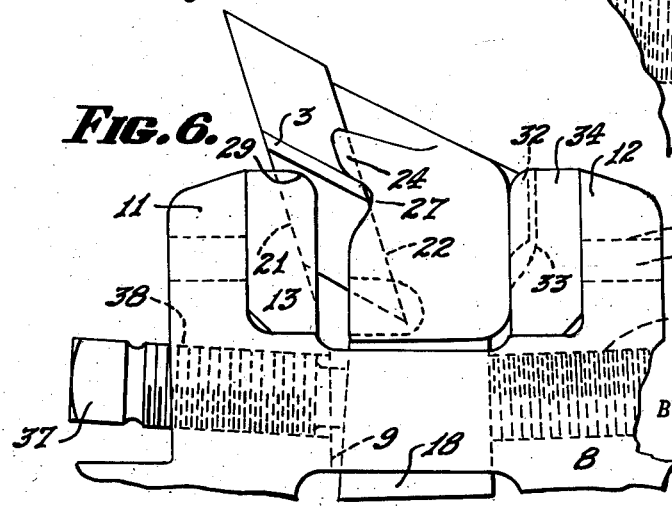
Figure 6 is a partial elevational view of an assembly of cutter bit and holding means which is reversible.

Figure 6 illustrates that if the front face of the bit engages the rear slanting face 21 of the anvil member and the rear face of the bit engages the front slanting face 22 of the clamping member, then the bottoming of the bit as at 31 is not necessary. Bits of substantially uniform size can be effectively bottomed and prevented from tilting by the wedging action of the side portions of the anvil and clamping members. The clamping member has the projections 23 and 24 overlying the ribs 2 and 3 to prevent upward displacement of the bit; but in Figure 6 the bit ribs are not engaged from beneath either by the rear clamping member or the anvil member.

Yet another arrangement is shown in Figure 7 wherein the cutter bit bottoms at 31 on the clamping member, but the ribs are not engaged from beneath either by the clamping member or the anvil member. The upper projections on the clamping member, as at 24 engage above the ribs.

Figure 9:
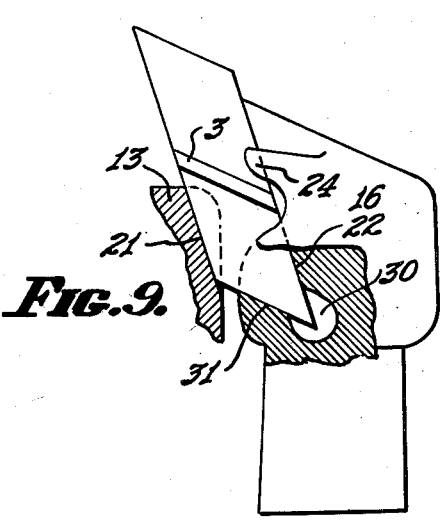
Figure 9 is an elevational view of a cutter bit and modified rear clamping element.

Figure 9 illustrates yet another arrangement wherein the front and rear faces of the cutter bit are clamped tightly between the rear recessed face 21 of the anvil member and the forward recessed face 22 of the clamping member, but the lower edge of the bit bottoms as at 31. In this arrangement the upper projections 23 and 24 of the clamping member lie above the ribs 2 and 3 but not necessarily in engagement therewith; and the bit is held without means on either the anvil member or the clamping member to engage the ribs from beneath.

As indicated above in the various figures the ribs on the cutter bit may be employed (a) as means to withstand the downward or inward cutting thrusts or (b) as means to prevent outward displacement of the cutter bit, or (c) as means to prevent tilting of the cutter bit in the holding means, or any combination thereof. In spite of dimensional discrepancies in the bits, since the surfaces 21 and 22 lie aslant to the axis of the clamping member shank, bits may be tightly clamped therebetween by adjusting the position of the clamping member so long as longitudinal adjustment is not prevented by the engagement of some member or members with the ribs. The bottoming of the bits as at 31 in Figures 5, 7 and 9 is valuable for the resistance of inward thrust on the bits, and it will be noted that the bottoming surface is so positioned that the point of the bit may be worn away and a proper bottoming action still secured.

Figure 10:
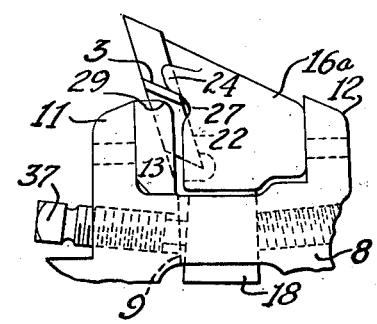
Figure 10 is a partial elevational view of a modified reversible cutter bit and holding means assembly.

In some cutting operations it is frequently desired to reverse the cutting direction. This may be attained in various ways with the structures of this invention. In Figure 10, by way of example, the socket member 8 is cut out so as to leave the upstanding projections 11 and 12, but the cut is symmetrically arranged with respect to socket opening 9. When this is done the rear portion of the clamping member 16 may be prolonged rearwardly, as at 16a, to contact the socket member projection 12, but it is usually more convenient to provide against the projection 12 a removable filler member 34, as illustrated in Figure 6. This filler member can be provided with a stud 35 adapted to enter a perforation 36 in the projection 12.

It will be evident that the structure shown in Figure 6 can be reversed by reversing the position of the clamping member 16. Since it is desirable to have the rear face of the clamping member shank 18 lying against a corresponding face of the socket perforation 9, the set screw 37 shown in Figure 6 as engaged in the threaded perforation 38 can be taken out and placed in another threaded perforation 39 at the opposite end of the socket member upon effecting the aforesaid reversal of parts.

Another way of attaining reversibility is shown in Figure 7 where again the cut away portion between the projections 11 and 12 is symmetrically arranged with respect to the socket perforation 9. Here, however, the surface 21 and adjacent parts have been formed directly in the projection 11. A similar surface 21a and attendant parts are formed as shown directly in the projection 12. This has the merit of diminishing the number of parts to be handled, but has the disadvantage that the entire socket member must be changed if the parts forming the integral anvil portions become worn or broken.

Since both projections 11 and 12 are hollowed out as shown, the rear face of the clamping member 16 may be provided with an integral lug 32 to enter the hollow and rest against the surfaces 21 or 21a. Similarly, as shown in Figure 6, the filler member 34 may be hollowed as at 33, and the clamping member 16 provided with a rearwardly extending lug 32.

Figure 8:
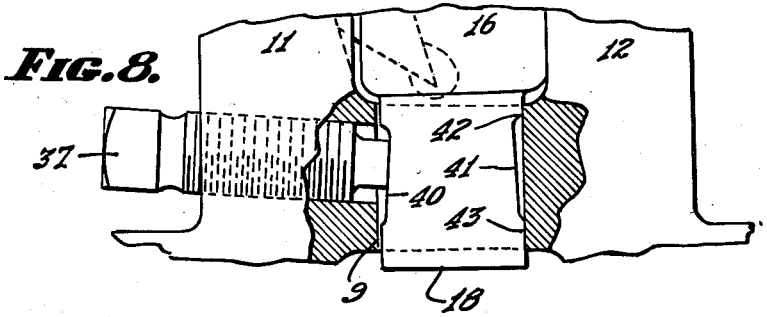
Figure 8 is a partial elevational view of the socket element of a cutting chain and a reversible rear clamping element with a modified shank.

For the proper engagement and holding of the shank of the clamping member, we prefer to form the leading edge thereof aslant as shown most clearly in Figures 6 and 7. The threaded perforations 38 and 39 are also formed aslant so that the axis of the set screw 37 will be perpendicular to the shank face engaged by the set screw. The same advantage may be attained upon reversal of the parts, but without changing the position of the set screw if the shank is configured as shown in Figure 8. Here a slanting face 40 is formed in an edge of the shank, but has a length less than the full length of the shank. A similar recess 41 is formed in the opposite edge of the shank. The length of these recesses is so proportioned that unrecessed adjacent shank portions 42 and 43 can abut the front or rear surfaces of the socket forming perforation 9. When the parts are in the position shown in Figure 8, the unrecessed rear edge portions of the shank 18 will engage the rear face of the perforation 9. When the parts are reversed, without reversing the set screw 37, the front unrecessed edge portions of the shank will engage the same surface of the socket forming opening.

The holding structures shown and claimed herein are capable of use with bits having a wide variety of cross sectional shapes. While we have shown cutter bits with lateral ribs 2 and 3 of substantially rectangular cross section, this is not a necessary limitation on the invention since other cutter bits may be employed with ribs of different configurations or with no ribs at all. It will be evident in Figure 9 that the ribs 2 and 3 may be eliminated on the cutter bit so long as the cutter bit is diamond shaped in cross section or essentially so, and so long as the clamping member projections 23 and 24 engage some portion of the bit narrower than its widest width so that the bit cannot be withdrawn endwise.

Modifications may be made in the invention without departing from the spirit of it. Having thus described the invention in an exemplary embodiment, what is claimed as new and desired to be secured by Letters Patent is:

1. A cutter bit of the type formed from rolled bar stock by transverse slantwise cuts, said cutter bit characterized by oppositely directed cutting points, formed at least at a substantially tapering edge, and by relatively massive, oppositely directed projecting ribs having upper and lower surfaces adjacent the body of the bit lying in substantially parallel planes substantially parallel to the plane of the bit midsection.

2. A cutter bit of the type formed from rolled bar stock by slantwise transverse cuts, said cutter bit having in cross section a relatively long and narrow diamond shape and further characterized by relatively massive lateral ribs at either side along the bit midsection, said ribs each having surfaces adjacent the bit body substantially parallel to each other and to the plane of the bit midsection.

3. A cutter bit claimed in claim 2 wherein the transverse cuts whereby the bit is formed from the bar stock are parallel to each other, the said bit having a rhomboidal shape in elevation.

4. In a cutting apparatus a socket member having a shank-receiving socket opening, a clamping member having a head, and a shank adapted to be received in said socket forming opening, and an anvil member, said anvil member and said clamping member having oppositely directed substantially parallel surfaces adapted to receive between them the front and rear surfaces of a cutter bit, said clamping surfaces lying at an angle to the axis of the shank of said clamping member whereby said surfaces can be adjusted toward and away from each other by longitudinal movement of said shank in said socket perforation, and a bit having its widest part at its midsection and characterized by substantially parallel-sided upstanding ribs at its midsection and arranged to be engaged between said surfaces, said anvil member and said clamping member having projected portions adapted to lie along sides of said bit below said ribs and said clamping member having projecting portions adapted to lie along sides of said bit above said ribs, whereby to limit longitudinal movement of said bit.

5. The structure claimed in claim 4 wherein said socket member has forward and rear projections, said anvil member lying against said forward projection and the head of said clamping member lying against said rear projection.

6. The structure claimed in claim 5 in which said upstanding substantially parallel sided ribs are engaged in notches in the projected portions of said clamping member.

7. The structure claimed in claim 5 wherein said clamping member is provided with a bottoming surface angularly related to its said clamping surface and adapted to contact the lower edge of said bit.

8. The structure claimed in claim 5 wherein said ribs contact said projections on said anvil member whereby inward thrusts on said bit are transferred in part at least to said anvil member.

9. The structure claimed in claim 5 wherein the space between said projections is symmetrical with respect to said socket forming perforation, wherein said anvil member is a separate part positionable against either of said projections and wherein a removable filler member is positioned between the head of said clamping member and the adjacent one of said projections, whereby the parts are rendered reversible.

10. The structure claimed in claim 5 wherein an anvil part is integrally formed in each of said projections whereby the bit and clamping member are rendered reversible in said structure.

11. The structure claimed in claim 10 wherein the head of said clamping member has a lug adapted to enter the recessed portion of the adjacent anvil member.

12. In a cutting structure for mining machines and the like, a socket element having a transverse socket forming perforation, an anvil element bottomed on said socket element and a clamping element having a head and a shank, said shank adapted to enter the perforation in said socket element and be held therein, in combination with a bit of rhomboidal shape having front and rear substantially parallel uni-planar surfaces and characterized by relatively massive ribs extending outwardly along its midsection, the said anvil element and the said clamping element having substantially parallel surfaces between which said bit may be clamped, said surfaces extending aslant to the axis of said shank, one at least of said anvil and clamping elements having portions projecting about the sides of said cutter bit, said portions being notched to receive end portions of said ribs.

13. The structure claimed in claim 12 wherein the notches in the last mentioned portions are shaped in such fashion as to engage said ribs from both sides so as to inhibit longitudinal movement of the said cutter bit and to resist inwardly directed cutting strains imposed thereon.

14. The structure claimed in claim 13 wherein said socket member is cut away transverse the said perforation, leaving upwardly directed projections front and rear, said anvil member lying against said front projection and the head portion of said clamping member shaped to abut said rear portion whereby to transfer to it some at least of the rearwardly directed cutting strains.

15. In a socket assembly, a chain link having a socket member, said socket member having a transverse socket forming perforation therein, an anvil member bottomed on said socket member, a clamping member having a head, and a depending shank adapted to enter said perforation, said anvil member and said socket member having parallel uni-planar surfaces adapted to receive between them front and rear parallel uni-planar surfaces of a rhomboidal cutter bit, said clamping member having portions projecting forwardly beyond its last mentioned surface and adapted to receive between them a portion of the body of a cutter bit in such position that the rear face of the cutter bit lies against the said face of the clamping member, the said projecting portions being slotted to accommodate ribs formed on the midsection of a cutter bit.

16. The structure claimed in claim 15 wherein forwardly projecting portions of said clamping element engage said ribs from above and wherein rearwardly projecting portions of said anvil element engage said ribs from beneath.

17. The structure claimed in claim 16 in which said clamping element is additionally formed with a bottom portion for engaging a lower edge of said cutter bit.

18. In a cutter assembly a chain link having a socket member with a transverse socket forming perforation, said socket member being cut away transversely at the top to leave forward and rear upward projections, an anvil member against the forward projection and bottomed against said socket member, a clamping member having a head shaped to lie against said rear projection and a shank adapted to enter said perforation, said anvil and clamping elements having substantially parallel planar surfaces between which a rhomboidal bit may be engaged, in combination with a rhomboidal bit characterized by upstanding lateral ribs at its midsection, said ribs each having substantially parallel surfaces adjacent the bit body, and means on at least one of said anvil and clamping elements for engaging said ribs from above and for engaging said ribs from beneath on the said substantially parallel surfaces, whereby the said bit is retained against longitudinal movement.

19. The structure claimed in claim 18 in which the socket element is formed with front and rear upward projections, in which said anvil element lies against said front projection and in which the head of said clamping element lies against the rear projection.

20. The structure claimed in claim 19 wherein said anvil element is releasably held against said forward projection.

21. The structure claimed in claim 20 wherein said shank is forced against the rear face of said socket forming perforation by a set screw threaded in said socket forming member beneath said forward upward projection, the axis of said set screw forming an acute angle with the horizontal, whereby to resist endwise withdrawal of said shank.

References Cited in the file of this patent

UNITED STATES PATENTS

| | | |
|---|---|---|
| 2,348,061 | Daberstein | May 2, 1944 |
| 2,415,107 | Morrow | Feb. 4, 1947 |
| 2,434,356 | Bowman | Jan. 13, 1948 |
| 2,613,069 | Bruestle | Oct. 7, 1952 |
| 2,644,680 | Simmons | July 7, 1953 |